Patented Mar. 25, 1952

2,590,073

UNITED STATES PATENT OFFICE 2,590,073

AMIDE DERIVATIVES AND PROCESS OF MAKING SAME

Otto Albrecht, Munchenstein, Switzerland, assignor to Ciba Limited, Basel, Switzerland, a Swiss firm No Drawing. Application February 17, 1948, Serial No. 9,030. In Switzerland March 17, 1947

16 Claims. (Cl. 260—404.5)

According to this invention new amide derivatives are made by reacting at least one mol of an alkylene oxide with one mol of a condensation product obtainable from an amide containing at least one hydrogen atom bound to the amide-nitrogen atom, formaldehyde and an amine containing at least one reactive hydrogen atom and which condensation product contains at least one reactive hydrogen atom.

The formaldehyde condensation product used as starting material may be derived, on the one hand, from a carboxylic acid amide or a sulfonic acid amide and, on the other, from a primary, secondary or tertiary amine, advantageously a hydroxyalkylamine such as monoethanolamine, diethanolamine or triethanolamine. Especially suitable starting materials are condensation products obtainable from a carboxylic acid amide, especially one containing at least 8 carbon atoms, for example, a fatty acid of high molecular weight, a resin acid or a naphthenic acid, and formaldehyde and a tertiary hydroxyalkylamine. Such condensation products may be made in known manner, for example, by the process of French Patent No. 903,249, from, for example, a higher fatty acid amide such as lauric acid amide, coconut oil fatty acid amide, palmitic acid amide, stearic acid amide, oleic acid amide or linoleic acid amide, and formaldehyde and a tertiary hydroxyalkylamine such as triethanolamine, tripropanolamine, tributanolamine, butyl-diethanolamine or di - (hydroxyethyl) - cyclohexylamine. The amide may, for example, be reacted with formaldehyde to form the N-methylolamide, and the latter reacted in a second stage with the tertiary hydroxyalkylamine, for example, by heating the N-methylolamide with the tertiary hydroxyalkylamine at about 100–140° C. advantageously under reduced pressure and in the presence of sodium carbonate. In this manner there is obtained a basic ether of an N-acylated aminomethanol containing the atomic grouping

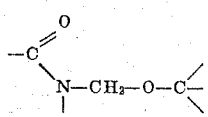

A group of suitable starting materials which are easily accessible correspond to the formula

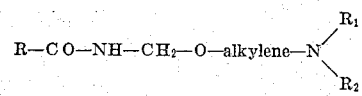

wherein R—CO— is the acyl radical of a carboxylic acid and $R_1$ and $R_2$ are alkyl radicals or hydroxy alkyl radicals. For instance, the condensation product which is obtainable from stearic acid amide, formaldehyde and triethanolamine, and is suitable as a starting material in the present invention, has the constitution

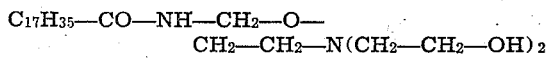

$C_{17}H_{35}$—CO—NH—CH$_2$—O—
  CH$_2$—CH$_2$—N(CH$_2$—CH$_2$—OH)$_2$

For the purpose of the present invention there are to be understood as "reactive hydrogen atoms" hydrogen atoms which are bound to nitrogen, oxygen or sulfur.

As alkylene oxides for use in the present invention there are especially suitable ethylene oxide and glycide.

The reaction of the alkylene oxide with the above described condensation products is advantageously conducted at a temperature exceeding 75° C., for example, at 100–180° C. The easily volatile ethylene oxide can be brought into reaction under atmospheric or superatmospheric pressure. In both cases it is of advantage to pass or inject the ethylene oxide slowly into the reaction mixture as it is consumed. When working in a pressure vessel it is of advantage not to allow the pressure in the gas phase to exceed 4–10 atmospheres. There may be added a catalyst, especially a substance of alkaline reaction, for example, an alkali hydroxide, an alkali salt of an organic carboxylic acid advantageously one of low molecular weight, such as sodium acetate, or an alkali metal such as sodium. Depending on the desired solubility of the final product 1 mol or more than 1 mol of the alkylene oxide, for example, 2–20 mols, may be reacted with 1 mol of the condensation product. Salts of the above described condensation products with acids may also be used for the reaction with alkylene oxides.

The products of the invention in the form of their salts with aliphatic acids of low molecular weight, and in many cases in the form of the free bases, especially when more than 1 mol of alkylene oxide has entered into reaction, are soluble in water and can be used as textile assistants. Especially valuable are products which contain an aliphatic or cycloaliphatic residue of at least 12 carbon atoms; they can be used as wetting, dispersing or levelling agents, and also as softening agents, but more especially as agents for preventing the agglomeration of fibrils in the manufacture of staple fibers of regenerated cellulose. For the latter purpose there are also suitable mixtures of sulfonated oils, for example, sulfonated olive oil or sulfonated castor oil, with products of the invention which contain an aliphatic residue of 16–18 carbon atoms. Other substances customarily used with textile assistants can also be used together with the products of the invention. Products of the invention may correspond to the general formula

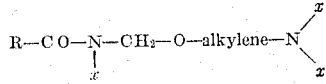

wherein R—CO— is the acyl radical of a carboxylic acid and wherein at least one $x$ is hydroxy alkyl interrupted by at least one ether bridge the remaining $x$ being hydroxy alkyl radicals. An ether bridge corresponds to the group —O— as is well known. As examples there may be cited products of the formula

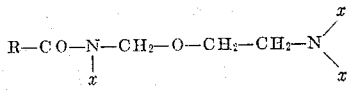

wherein R—CO— is the acyl radical of a carboxylic acid and wherein at least one $x$ is —(CH$_2$—CH$_2$—O)$_n$—H in which radical $n$ varies from 1–20 and is, for instance, 1–3, the remaining $x$ being —CH$_2$—CH$_2$—OH.

The following examples illustrate the invention, the parts being by weight unless otherwise stated and the relationship of parts by weight to parts by volume being the same as that of the kilogram to the liter:

*Example 1*

1420 parts of the condensation product of the formula

R—CO—NH—CH$_2$—O—CH$_2$—CH$_2$—N(CH$_2$—CH$_2$—OH)$_2$ in which R—CO— represents the acyl residue of commercial stearic acid (which is obtainable, for example, by heating commercial stearic acid N-methylolamide with the triethanolamine at 100–111° C. under reduced pressure with the addition of sodium carbonate, and then removing water, which may be brought about for example by means of benzene) are heated to 130° C., and then 3–18 parts of sodium in finely divided form are added in small portions. 454 parts of ethylene oxide are then introduced at 130–140° C. The ethylene oxide is rapidly absorbed under atmospheric pressure provided that care is taken to secure a fine distribution of the gaseous ethylene oxide introduced. The reaction product is a soft mass, which is taken up in water, especially with the aid of heat, to produce an opalescent solution. The new product can be used as a softening agent for viscose artificial silk. It corresponds to the formula

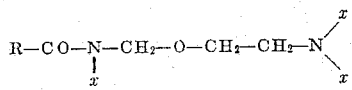

wherein R—CO— is the acyl radical of commercial stearic acid, two $x$'s are

—(CH$_2$—CH$_2$—O)$_2$—H and one $x$ is —CH$_2$—CH$_2$—OH. A product with similar properties may be obtained if ethylene oxide is replaced by glycide. In a similar manner the stearic acid derivative used as starting material may be replaced by the corresponding capric acid or lauric acid derivative. Instead of triethanolamine derivatives corresponding ethers of diethylethanolamine or of tripropanolamines may be used as parent materials.

A product suitable for vivifying staple fibers of regenerated cellulose is obtained by adding 1 part of water in small portions and while stirring to 1 part of the above described condensation product heated to its fusion point, and mixing the paste so obtained with 2 parts of ordinary commercial Turkey red oil.

*Example 2*

750 parts of the condensation product of the formula

R-CO-NH-CH$_2$-O-CH$_2$-CH$_2$-N(CH$_2$-CH$_2$-OH)$_2$ in which R—CO— represents the acyl residue of commercial oleic acid (which is obtainable, for example, from oleic acid N-methylolamide and triethanolamine in a manner similar to that described in Example 1), are completely dehydrated, which can be brought about for example by means of benzene, and heated to 90° C. whereupon 1.5 parts of finely divided sodium are added in small portions. 225 parts of ethylene oxide are then introduced at about 90–95° C. It is taken up relatively rapidly if the gaseous ethylene oxide is brought into reaction in a finely distributed form. The greater part of the condensation product obtained in this manner is liquid at room temperature. The new product is taken up in warm water to form an opalescent solution. It can be used as a softening agent or as an agent for vivifying staple fibers or regenerated cellulose. It corresponds to the formula

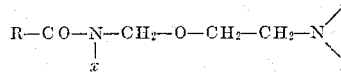

wherein R—CO— is the acyl radical of commercial oleic acid, two $x$'s are —(CH$_2$—CH$_2$—O)$_2$—H and one $x$ is —CH$_2$—CH$_2$—OH.

*Example 3*

A mixture of 100 parts of the condensation product of the formula

R-CO-NH-CH$_2$-O-CH$_2$-CH$_2$-N(CH$_2$-CH$_2$-OH)$_2$ in which R—CO— represents the acyl residue of commercial stearic acid (see Example 1) and 100 parts of the corresponding oleic acid amide derivative (see Example 2) is heated to 90° C. and 0.4 part of finely divided sodium is added in small portions. 62 parts of gaseous ethylene oxide are then introduced at 90–95° C. under atmospheric pressure, care being taken to secure fine distribution of the gas stream. A soft mass is obtained which yields an opalescent solution in warm water. The new product can be used as a softening agent for viscose artificial silk and also as a vivifying agent for staple fibers of regenerated cellulose.

*Example 4*

The procedure is the same as that described in Example 1, except that instead of using 3 mols of ethylene oxide there are used 2 mols thereof, that is to say, 4.4 parts of ethylene oxide are brought into reaction with 21.5 parts of the N-methylolstearic acid amide-triethanolamide condensation product. The new product, which is a wax-like mass, is taken up by warm water to form an opalescent solution and can be used as an agent for vivifying staple fibers of regenerated cellulose.

Example 5

20 parts of the condensation product used in Example 1 and 0.1 part of finely divided sodium are heated to 130° C., and then 41 parts of gaseous ethylene oxide are introduced at 130–140° C. under atmospheric pressure. The new product so obtained is a soft mass which is soluble in water and can be used as a textile assistant, for example, as a levelling agent.

Example 6

400 parts of the condensation product from commercial stearic acid-N-methylolamide and triethanolamine prepared as described below, which still contains about 2 per cent. of water and is therefore not completely free from water, are heated to 130° C., and then 130 parts of gaseous ethylene oxide are introduced at 130–140° C. The latter is rapidly taken up under atmospheric pressure provided that it is finely distributed. The condensation product has the same properties as the product of Example 1 and can be used for the same purposes, for example, for vivifying staple fibers of regenerated cellulose.

The condensation product may be prepared in the following manner: 250 parts of commercial stearic acid amide are converted in known manner into stearic acid N-methylolamide by means of 36.3 parts of para-formaldehyde. 160 parts of triethanolamine and 7.3 parts of anhydrous sodium carbonate are added, and the whole is heated while stirring at 108° C., the reaction vessel being evacuated to a sub-atmospheric pressure of about 20 centimeters of mercury. Then the pressure is decreased to 36 centimeters of mercury, the whole is stirred for about 3–4 hours at 108–111° C. and allowed to cool.

Example 7

Staple fibers of regenerated cellulose are vivified in the following manner: Stable fibers of regenerated cellulose are worked at a liquor ratio of 1:40 for ½ hour in a bath heated to 40° C. and containing, per liter, 2.5–5 grams of the mixture containing Turkey red oil described in Example 1. After centrifuging and drying the staple fibers so treated, they possess a soft feel and can be easily drawn.

Example 8

Chlorinated wool is softened in the following manner: The material is worked at a liquor ratio of 1:20 for 1 hour in a bath heated to 20° C. and containing, per liter, 2 grams of the mixture containing Turkey red oil described in Example 1. After centrifuging and drying the material so treated, it has a soft feel.

Having thus described the invention, what is claimed is:

1. A process for the manufacture of a new amide derivative which comprises adding at least one mol of an alkylene oxide to an N-acylated amino methyl ether of the formula

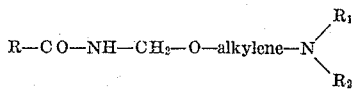

wherein R—CO— is the acyl radical of a fatty acid containing at least 12 carbon atoms and $R_1$ and $R_2$ are lower hydroxy alkyl radicals.

2. A process for the manufacture of a new amide derivative which comprises adding at least one mol of ethylene oxide to an N-acylated amino methyl ether of the formula

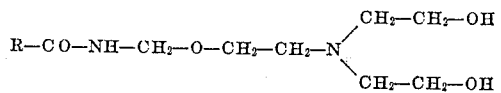

wherein R—CO— is the acyl radical of a fatty acid containing at least 12 carbon atoms at a temperature exceeding 75° C.

3. A process for the manufacture of a new amide derivative which comprises adding about 3 mols of ethylene oxide to an N-acylated amino methyl ether of the formula

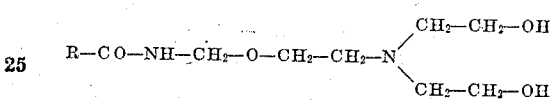

wherein R—CO— is the acyl radical of a fatty acid containing at least 12 carbon atoms at a temperature exceeding 75° C.

4. A process for the manufacture of a new amide derivative which comprises adding at least one mol of ethylene oxide to an N-acylated amino methyl ether of the formula

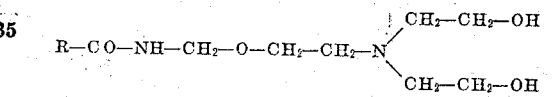

wherein R—CO— is the acyl radical of a fatty acid containing 16 to 18 carbon atoms at a temperature exceeding 75° C.

5. A process for the manufacture of a new amide derivative which comprises adding about three mols of ethylene oxide to an N-acylated amino methyl ether of the formula

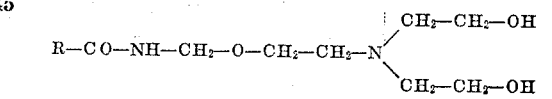

wherein R—CO— is the acyl radical of commercial stearic acid at a temperature of at least 120° C.

6. A process for the manufacture of a new amide derivative which comprises adding about three mols of ethylene oxide to an N-acylated amino methyl ether of the formula

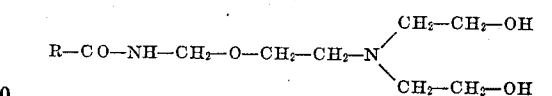

wherein R—CO— is the acyl radical of commercial oleic acid at a temperature of at least 120° C.

7. A process for the manufacture of a new amide derivative which comprises adding about 20 mols of ethylene oxide to an N-acylated amino methyl ether of the formula

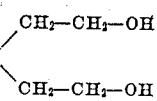

wherein R—CO— is the acyl radical of a fatty acid containing at least 12 carbon atoms at a temperature exceeding 75° C.

8. A process for the manufacture of a new amide derivative which comprises adding about twenty mols of ethylene oxide to an N-acylated amino methyl ether of the formula

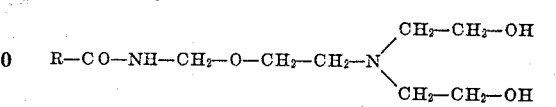

wherein R—CO— is the acyl radical of commercial stearic acid at a temperature of at least 120° C.

9. A product of the general formula

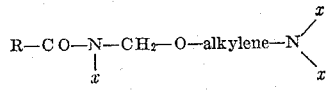

wherein R—CO— is the acyl radical of a fatty acid containing at least 12 carbon atoms and wherein at least one $x$ is lower hydroxy alkyl interrupted by at least one ether bridge the remaining $x$ being lower hydroxy alkyl radicals.

10. A product of the general formula

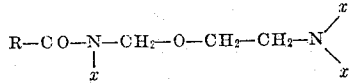

wherein R—CO— is the acyl radical of a fatty acid containing at least 12 carbon atoms and wherein at least one $x$ is —(CH$_2$—CH$_2$—O)$_n$—H in which radical $n$ varies from 1 to 20, the remaining $x$ being —CH$_2$—CH$_2$—OH.

11. A product of the general formula

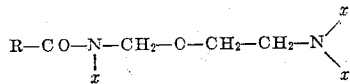

wherein R—CO— is the acyl radical of a fatty acid containing 16 to 18 carbon atoms and wherein at least one $x$ is —(CH$_2$—CH$_2$—O)$_n$—H in which radical $n$ varies from 1 to 20, the remaining $x$ being —CH$_2$—CH$_2$—OH.

12. A product of the general formula

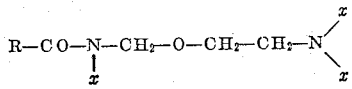

wherein R—CO— is the acyl radical of a fatty acid containing 16 to 18 carbon atoms and wherein at least one $x$ is

—(CH$_2$—CH$_2$—O)$_{1-3}$—H the remaining $x$ being —CH$_2$—CH$_2$—OH.

13. A product of the general formula

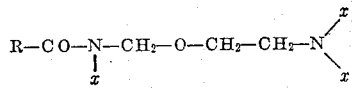

wherein R—CO— is the acyl radical of a fatty acid containing 16 to 18 carbon atoms wherein two $x$'s are —(CH$_2$—CH$_2$—O)$_2$—H and one $x$ is —CH$_2$—CH$_2$—OH.

14. A product of the general formula

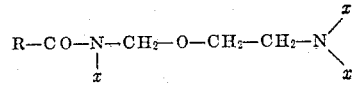

wherein R—CO— is the acyl radical of commercial stearic acid and wherein two $x$'s are —(CH$_2$—CH$_2$—O)$_2$—H and one $x$ is

—CH$_2$—CH$_2$—OH

15. A product of the general formula

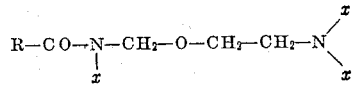

wherein R—CO— is the acyl radical of commercial oleic acid and wherein two $x$'s are —(CH$_2$—CH$_2$—O)$_2$—H and one $x$ is

—CH$_2$—CH$_2$—OH

16. The addition product of 20 mols of ethylene oxide to one mol of the product of the formula

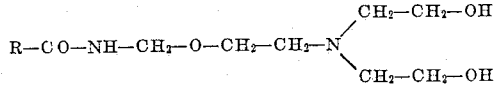

wherein R—CO— is the acyl radical of commercial stearic acid.

OTTO ALBRECHT.

REFERENCES CITED

The following references are of record in the file of this patent:

UNITED STATES PATENTS

| Number | Name | Date |
|---|---|---|
| 2,279,497 | Sallmann et al. | Apr. 14, 1942 |
| 2,361,185 | Engelmann et al. | Oct. 24, 1944 |
| 2,388,154 | Katzmann | Oct. 30, 1945 |
| 2,425,392 | Robinson | Aug. 12, 1947 |
| 2,523,934 | Albrecht et al. | Sept. 26, 1950 |